United States Patent
Kakura et al.

(10) Patent No.: US 6,470,366 B1
(45) Date of Patent: Oct. 22, 2002

(54) ANGLE CALCULATION CIRCUIT

(75) Inventors: Yoshikazu Kakura; Tomoki Osawa, both of Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/444,244

(22) Filed: Nov. 19, 1999

(30) Foreign Application Priority Data

Nov. 20, 1998 (JP) ............................................. 10-331785

(51) Int. Cl.[7] ............................... G06F 7/38; G06F 1/02
(52) U.S. Cl. ........................................ 708/440; 708/276
(58) Field of Search ................................ 708/276, 440, 708/622, 200

(56) References Cited

U.S. PATENT DOCUMENTS 3,956,623 A  *  5/1976  Clark et al. ................. 708/440
4,896,287 A  *  1/1990  O'Donnell et al. .......... 708/622
4,945,505 A  *  7/1990  Wiener et al. ............... 708/204

* cited by examiner

Primary Examiner—Tan V. Mai
(74) Attorney, Agent, or Firm—Dickstein, Shapiro, Morin & Oshinsky, LLP.

(57) ABSTRACT

A sign determination circuit is input with in-phase signal I, and outputs in-phase sign determination signal $S_{PI}$ to indicate the sign, positive or negative, of in-phase signal I. Another sign determination circuit is input with orthogonal signal Q, and outputs orthogonal sign determination signal $S_{PQ}$ to indicate the sign, positive or negative, of orthogonal signal Q. A decoder is input with in-phase sign determination signal $S_{PI}$ and orthogonal sign determination signal $S_{PQ}$, judging which quadrant the vector represented by in-phase signal I and orthogonal signal Q belongs to, thereby determining $I\theta_4$, $I\theta_3$ to indicate the 180° bit and 90°-bit, respectively, of angle information $I\theta$. Also, $I\theta_2$, $I\theta_1$ to indicate the 45°-bit and 22.5°-bit, respectively, of angle information $I\theta$ is given by the other decoders.

14 Claims, 5 Drawing Sheets

ANGLE CALCULATION CIRCUIT

FIELD OF THE INVENTION

This invention relates to an angle calculation circuit for calculating the phase of two-dimensional vector.

BACKGROUND OF THE INVENTION

Conventionally, an angle calculation circuit using a ROM (read-only memory) is known. Referring to FIG. 1, the conventional angle calculation circuit is explained below. A ROM 401 is input with in-phase component I of M bits and orthogonal component Q of M bits, and then outputs an arctan (Q/I) (arctangent) value of L bits that is written in an address corresponding to these I and Q as angle information signal.

Thus, the conventional angle calculation circuit conducts the angle calculation using the ROM. However, such an angle calculation circuit must incur an increase in circuit size.

SUMMARY OF THE INVENTION

Accordingly, it is an object of the invention to provide an angle calculation circuit that realizes the angle calculation by a simple composition without ROM.

According to the invention, an angle calculation circuit, comprises:

a sign determination circuit to which two-dimensional vector composed of in-phase signal and orthogonal signal is input and which determines the sign of the in-phase signal and the orthogonal signal and outputs a group of in-phase sign determination signals and a group of orthogonal sign determination signals;

a first decoder to which the group of in-phase sign determination signals and the group of orthogonal sign determination signals are input and which outputs calculating angle information by unit of more than 90° as first angle information signal;

an angle-narrowing condition generating circuit to which the in-phase signal and the orthogonal signal are input and which outputs a group of angle-narrowing condition signals to indicate the conditions for calculating angle information by unit of less than 90°; and a second decoder to which the group of angle-narrowing condition signals, the group of in-phase sign determination signals and the group of orthogonal sign determination signals are input and which outputs calculating angle information by unit of less than 90° as second angle information signal;

wherein the angle-narrowing condition generating circuit comprises a tangent calculation circuit to which the in-phase signal is input and which outputs a group of tangent signals given by multiplying the in-phase signal by tan φ (φ is a predetermined constant to satisfy 0°<φ<90°), and a comparator to which the group of tangent signals and the orthogonal signal are input and which compares the group of tangent signals and the orthogonal signal and outputs the angle-narrowing condition signal.

According to another aspect of the invention, an angle calculation circuit, comprises:

a sign determination circuit to which two-dimensional vector composed of in-phase signal and orthogonal signal is input and which determines the sign of the in-phase signal and the orthogonal signal and outputs a group of in-phase sign determination signals and a group of orthogonal sign determination signals;

a first decoder to which the group of in-phase sign determination signals and the group of orthogonal sign determination signals are input and which outputs calculating angle information by unit of more than 90° as first angle information signal;

an absolute-value calculation circuit to which the in-phase signal and the orthogonal signal are input and which calculates the absolute values of the in-phase signal and the orthogonal signal and outputs the absolute values the in-phase signal and the orthogonal signal as in-phase absolute-value signal and orthogonal absolute-value signal, respectively;

an angle-narrowing condition generating circuit to which the in-phase absolute-value signal and the orthogonal absolute-value signal are input and which outputs a group of angle-narrowing condition signals to indicate the conditions for calculating angle information by unit of less than 90°; and a second decoder to which the group of angle-narrowing condition signals, the group of in-phase sign determination signals and the group of orthogonal sign determination signals are input and which outputs calculating angle information by unit of less than 90° as second angle information signal;

wherein the angle-narrowing condition generating circuit comprises a tangent calculation circuit to which the in-phase absolute-value signal is input and which outputs a group of tangent signals given by multiplying the in-phase absolute-value signal by either tans or tan φ or tan (90°−φ)(φ is a predetermined constant to satisfy 0°<φ<90°), and a comparator to which the group of tangent signals and the orthogonal absolute-value signal are input and which compares the group of tangent signals and the orthogonal absolute-value signal and outputs the angle-narrowing condition signal.

According to another aspect of the invention, an angle calculation circuit, comprises:

a sign determination circuit to which two-dimensional vector composed of in-phase signal and orthogonal signal is input and which determines the sign of the in-phase signal and the orthogonal signal and outputs a group of in-phase sign determination signals and a group of orthogonal sign determination signals;

a first decoder to which the group of in-phase sign determination signals and the group of orthogonal sign determination signals are input and which outputs calculating angle information by unit of more than 90° as first angle information signal;

an absolute-value calculation circuit to which the in-phase signal and the orthogonal signal are input and which calculates the absolute values of the in-phase signal and the orthogonal signal and outputs the absolute values the in-phase signal and the orthogonal signal as in-phase absolute-value signal and orthogonal absolute-value signal, respectively;

an angle-narrowing condition generating circuit to which the in-phase absolute-value signal and the orthogonal absolute-value signal are input and which outputs absolute-value comparison signal to indicate the comparison result of the in-phase absolute-value signal and the orthogonal absolute-value signal, and outputs a group of angle-narrowing condition signals to indicate the conditions for calculating angle information by unit of less than 90°; and a second decoder to which the absolute-value comparison signal, the group of angle-narrowing condition signals, the group of in-phase sign determination signals and the group of orthogonal sign determination signals are input and which outputs calculating angle information by unit of less than 90° as second angle information signal;

wherein the angle-narrowing condition generating circuit comprises a first comparator to which the in-phase absolute-value signal and the orthogonal absolute-value signal are input and which compares the in-phase absolute-value signal and the orthogonal absolute-value signal and outputs the absolute-value comparison signal, a selector to which the in-phase absolute-value signal, the orthogonal absolute-value signal and the absolute-value comparison signal are input and which outputs larger one of the in-phase absolute-value signal and the orthogonal absolute-value signal as first selection absolute-value signal and smaller one of the in-phase absolute-value signal and the orthogonal absolute-value signal as second selection absolute-value signal, a tangent calculation circuit to which the first selection absolute-value signal is input and which outputs a group of tangent signals given by multiplying the first selection absolute-value signal by either tan $\phi$ or tan (90°−$\phi$) ($\phi$ is a predetermined constant to satisfy 0°<$\phi$<90°), and a second comparator to which the group of tangent signals and the second selection absolute-value signal are input and which compares the group of tangent signals and the second selection absolute-value signal and outputs the angle-narrowing condition signal.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
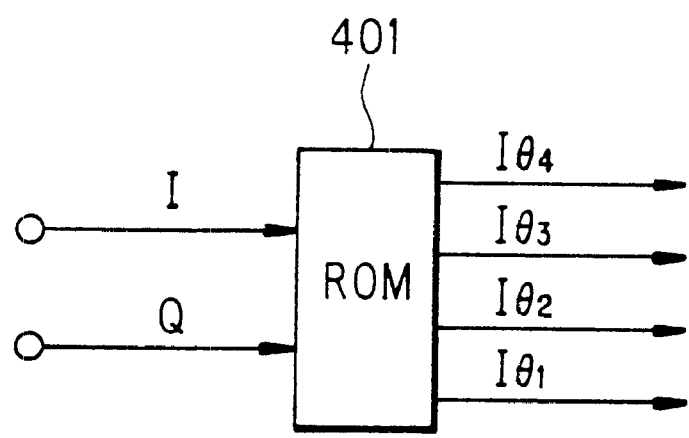
FIG. 1 is a block diagram showing the composition of the conventional angle calculation circuit.

The preferred embodiments of the invention will be explained below referring to the drawings.

Figure 2:
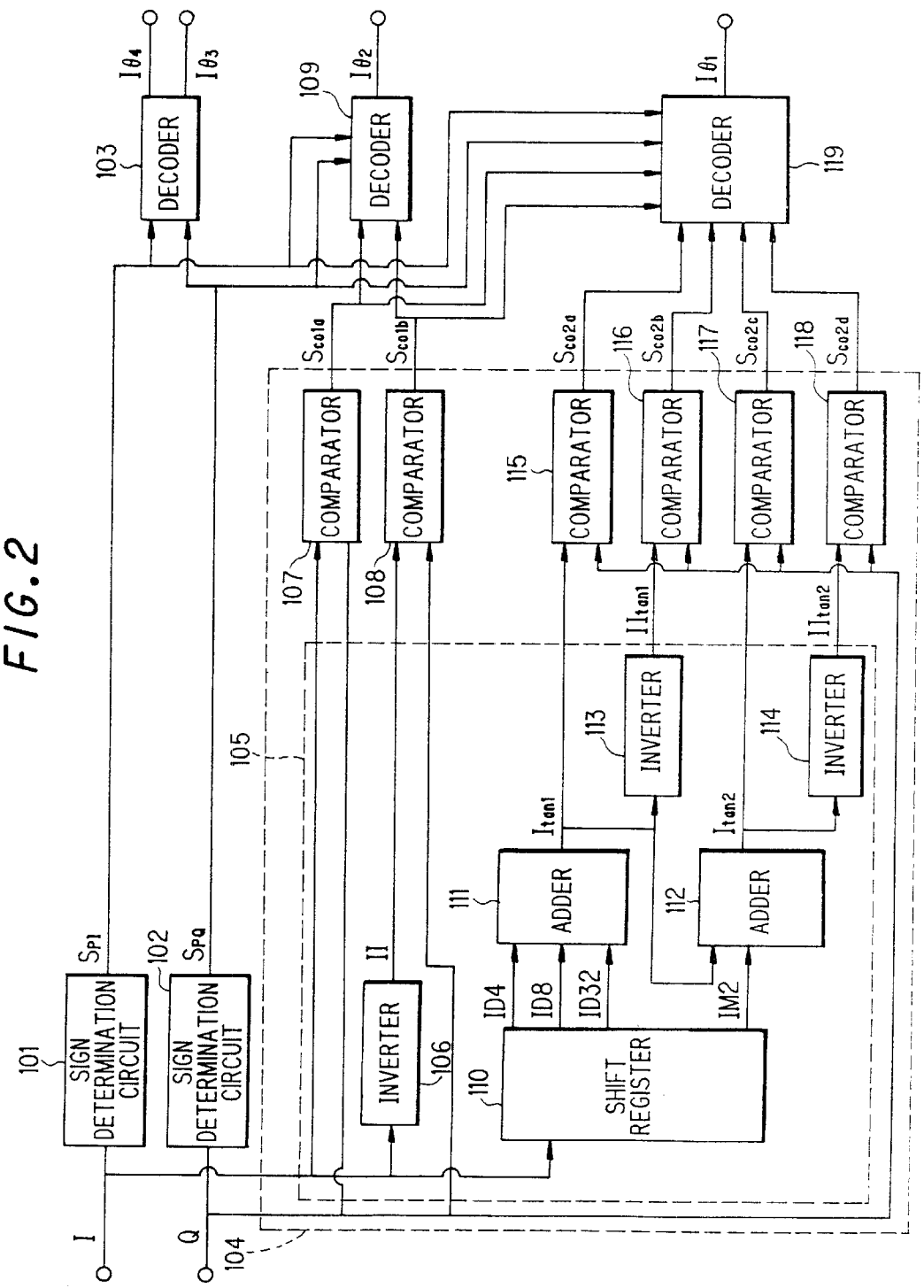
FIG. 2 is a block diagram showing an angle calculation circuit in a first preferred embodiment according to the invention.

FIG. 2 is a block diagram showing the first preferred embodiment according to the invention.

A sign determination circuit 101 is input with in-phase signal I, and outputs in-phase sign determination signal $S_{PI}$ to indicate the sign, positive or negative, of in-phase signal I. A sign determination circuit 102 is input with orthogonal signal Q, and outputs orthogonal sign determination signal $S_{PQ}$ to indicate the sign, positive or negative, of orthogonal signal Q. A decoder 103 is input with in-phase sign determination signal $S_{PI}$ and orthogonal sign determination signal $S_{PQ}$, judging which quadrant the vector represented by in-phase signal I and orthogonal signal Q belongs to, thereby determining I$\theta_4$, I$\theta_3$ to indicate the 180°-bit and 90°-bit, respectively, of angle information I$\theta$.

An inverter 106 is input with in-phase signal I, inverting the sign, outputting inverted in-phase signal II. A comparator 107 is input with in-phase signal I and orthogonal signal Q, comparing the largeness between them, then outputting angle-narrowing condition signal $S_{co1a}$ to indicate the comparison result. A comparator 108 is input with inverted in-phase signal II and orthogonal signal Q, comparing the largeness between them, then outputting angle-narrowing condition signal $S_{co1b}$ to indicate the comparison result.

A decoder 109 is input with in-phase sign determination signal $S_{PI}$, orthogonal sign determination signal $S_{PQ}$, angle-narrowing condition signals $S_{co1a}$, and angle-narrowing condition signals $S_{co1b}$. Then it outputs I$\theta_2$=1, where I$\theta_2$ is 45°-bit of angle information I$\theta$, based on the conditions that orthogonal signal Q is equal to or more than in-phase signal I when angle $\theta$ is larger than 0° and smaller than 90°, that orthogonal signal Q is equal to or less than inverted in-phase signal II when angle $\theta$ is larger than 90° or smaller than 180°, that orthogonal signal Q is equal to or less than in-phase signal I when angle $\theta$ is larger than 180° and smaller than 270°, and that orthogonal signal Q is equal to or more than inverted in-phase signal II when angle $\theta$ is larger than 270° and smaller than 360°.

A shift register 110 is input with in-phase signal I, then outputting ¼-time in-phase signal ID4 to ¼ times it by 2-bit shifting, ⅛-time in-phase signal ID8 to ⅛ times it by 3-bit shifting, 1/32 time in-phase signal ID32 to 1/32 times it by 5-bit shifting, and 2-time in-phase signal IM2 to 2 times it by 1-bit shifting. An adder 111 is input with ¼-time in-phase signal ID4, ⅛-time in-phase signal ID8 and 1/32-time in-phase signal ID32, adding them, then outputting tangent signal $I_{tan1}$ corresponding to a value obtained multiplying in-phase signal I by tan 22.5. An adder 112 is input with tangent signal $I_{tan1}$ and 2-time in-phase signal IM2, adding them, then outputting tangent signal $I_{tan2}$ corresponding to a value obtained multiplying in-phase signal I by tan 67.5°. An inverter 113 is input with tangent signal $I_{tan2}$, inverting the sign, outputting inverted tangent signal II$_{tan2}$.

A comparator 115 is input with tangent signal $I_{tan1}$ and orthogonal signal Q, comparing the largeness between them, then outputting angle-narrowing condition signal $S_{co2a}$ to represent the comparison result. A comparator 116 is input with inverted tangent signal II$_{tan1}$ and orthogonal signal Q, comparing the largeness between them, then outputting angle-narrowing condition signal $S_{co2b}$ to represent the comparison result. A comparator 117 is input with tangent signal $I_{tan2}$ and orthogonal signal Q, comparing the largeness between them, then outputting angle-narrowing condition signal $S_{co2c}$ to represent the comparison result. A comparator 118 is input with inverted tangent signal II$_{tan2}$ and orthogonal signal Q, comparing the largeness between them, then outputting angle-narrowing condition signal $S_{co2d}$ to represent the comparison result.

A decoder 119 is input with in-phase sign determination signal $S_{PI}$, orthogonal sign determination signal $S_{PQ}$, angle-narrowing condition signal $S_{co1a}$, angle-narrowing condition signal $S_{co1b}$, angle-narrowing condition signal $S_{co2a}$, angle-narrowing condition signal $S_{co2b}$, angle-narrowing condition signal $S_{co2c}$, and angle-narrowing condition signal $S_{co2d}$. Then, it outputs I$\theta_1$=1, where I $\theta_1$ is 22.5°-bit of angle information I$\theta$, based on the conditions that orthogonal signal Q is equal to or more than tangent signal $I_{tan1}$ when angle $\theta$ is larger than 0° and smaller than 45°, that orthogonal signal Q is equal to or more than tangent signal $I_{tan2}$ when angle $\theta$ is larger than 45° and smaller than 90°, that orthogonal signal Q is equal to or less than inverted tangent signal $I_{tan2}$ when angle $\theta$ is larger than 90° and smaller than 135°, that orthogonal signal Q is equal to or less than inverted tangent signal $II_{tan1}$ when angle $\theta$ is larger than 135° and smaller than 180°, that orthogonal signal Q is equal to or less than tangent signal $I_{tan1}$ when angle $\theta$ is larger than 180° and smaller than 225°, that orthogonal signal Q is equal to or less than tangent signal $I_{tan2}$ when angle $\theta$ is larger than 225° and smaller than 270°, that orthogonal signal Q is equal to or more than tangent signal $II_{tan2}$ when angle $\theta$ is larger than 270° and smaller than 315°, and that orthogonal signal Q is equal to or more than tangent signal $II_{tan1}$ when angle $\theta$ is larger than 315° and smaller than 360°.

In FIG. 2, an angle-narrowing condition generating circuit 104 and a tangent calculation circuit 105 are indicated by dotted lines. The angle calculation can be conducted by the simple circuit composition thus formed.

Although, in this embodiment and another embodiment described later, the angle-narrowing conditions are calculated based on in-phase signal, it maybe also calculated based on orthogonal signal. Although, in this embodiment, the angle calculation is conducted at a precision of 4-bit, the precision of calculation for angle calculation circuits according to the invention is not to 4-bit, and may be 5 or more-bit, i.e., at 11.25° or higher precision. For example, when using 5-bit, a shift register and adders for conducting the approximate multiplication between in-phase signal and tan 1.25°, comparators for comparing the result and in-phase signal may be added, and a decoder for calculating the fifth bit of angle information may be added.

Meanwhile, the angle-narrowing condition generating circuit in this embodiment can be generalized as below. Provided that the angle-narrowing condition generating circuit 104 outputs a group of angle-narrowing condition signals to indicate the conditions for calculating angle information by unit of $(360/2^L)°$ or more and less than 90° where L is an integer of 3 or more, the tangent calculation circuit 105 can be defined as such a circuit that is input with in-phase signal and then outputs a group of tangent signals obtained multiplying the in-phase signal by tan $\phi_{n,k,i}$ ($\phi_{n,k,i} = \{1/2^n + k/4 + i/2^{n-1}\} \times 360°$, n=3,4 ..., L, k=0,1,2,3, i=0, 1 ..., $2^{n-3}-1$).

An example of the operation of the angle calculation circuit in this embodiment in FIG. 2 is explained below.

For example, taken is a case that in-phase signal I and orthogonal signal Q are 8-bit quantized as $I=(I_8 I_7 I_6 I_5 I_4 I_3 I_2 I_1)=(11000010)$ and $Q=(Q_8 Q_7 Q_6 Q_5 Q_4 Q_3 Q_2 Q_1)=(01010001)$. Here, in-phase signal I and orthogonal signal Q are represented by complement of two, and $I_8$ and $Q_8$ are most significant bits to indicate the sign. Hereupon, in-phase signal I and orthogonal signal Q are −62 and 81, respectively, in decimal system. Since in-phase signal I is negative and orthogonal signal Q is positive, in-phase sign determination signal $S_{PI}$ is true on the condition of I<0 and orthogonal sign determination signal $S_{PQ}$ is true on the condition of Q>0. Therefore, angle $\theta$ is 90°<$\theta$<180°, and $I\theta_4=0$, $I\theta_3=1$ are obtained.

Since angle $\theta$ is 90°<$\theta$<180, the condition to give $I\theta_2=1$ is that orthogonal signal Q is equal to or less than inverted in-phase signal II. Inverted in-phase signal II=(00111110) is obtained, and angle-narrowing condition signal $S_{co1b}$ is true on the condition that orthogonal signal Q is larger than inverted in-phase signal II. Since this does not satisfy the condition to give $I\theta_2=1$, $I\theta_2=0$ is obtained. Since 90°<$\theta$<135° is thus obtained, the condition to give $I\theta_1=1$ is that orthogonal signal Q is equal to or less than inverted tangent signal $II_{tan2}$.

Inverted tangent signal $II_{tan2}$ is $-(1/4+1/8+1/32+2) \approx -2.408$ times in-phase signal I, −2.408 approximates to tan 112.5°$\approx$−2.414. Here, inverted tangent signal $II_{tan2}=(010010110)$ is obtained. Meanwhile, the bit number is extended to 9-bit. Angle-narrowing condition signal $S_{co2d}$ is true on the condition that orthogonal signal Q is smaller than inverted tangent signal $II_{tan2}$. Since this satisfies the condition to give $I\theta_1=1$, $I\theta_1=1$ is obtained.

Figure 5:
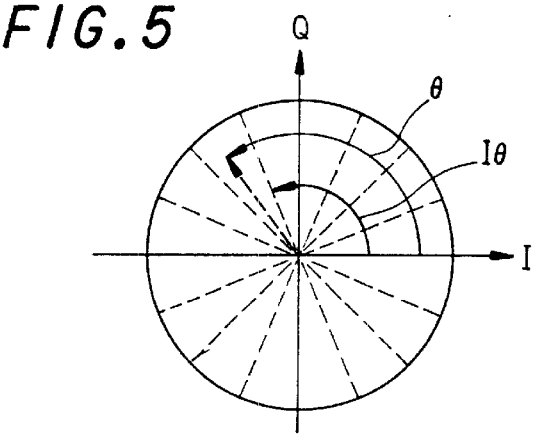
FIG. 5 is an illustration showing an example of angle calculation in the first embodiment.

Accordingly, angle information $I\theta=(I\theta_4\ I\theta_3 I\theta_2 I\theta_1)=(0101)$ is obtained, and this corresponds to 112.5°. The accurate angle $\theta$ is $\tan^{-1}(Q/I) \approx 127°$. These are shown on the coordinate axes in FIG. 5, which proves that the angle calculation is conducted by unit of 22.5°.

Figure 3:
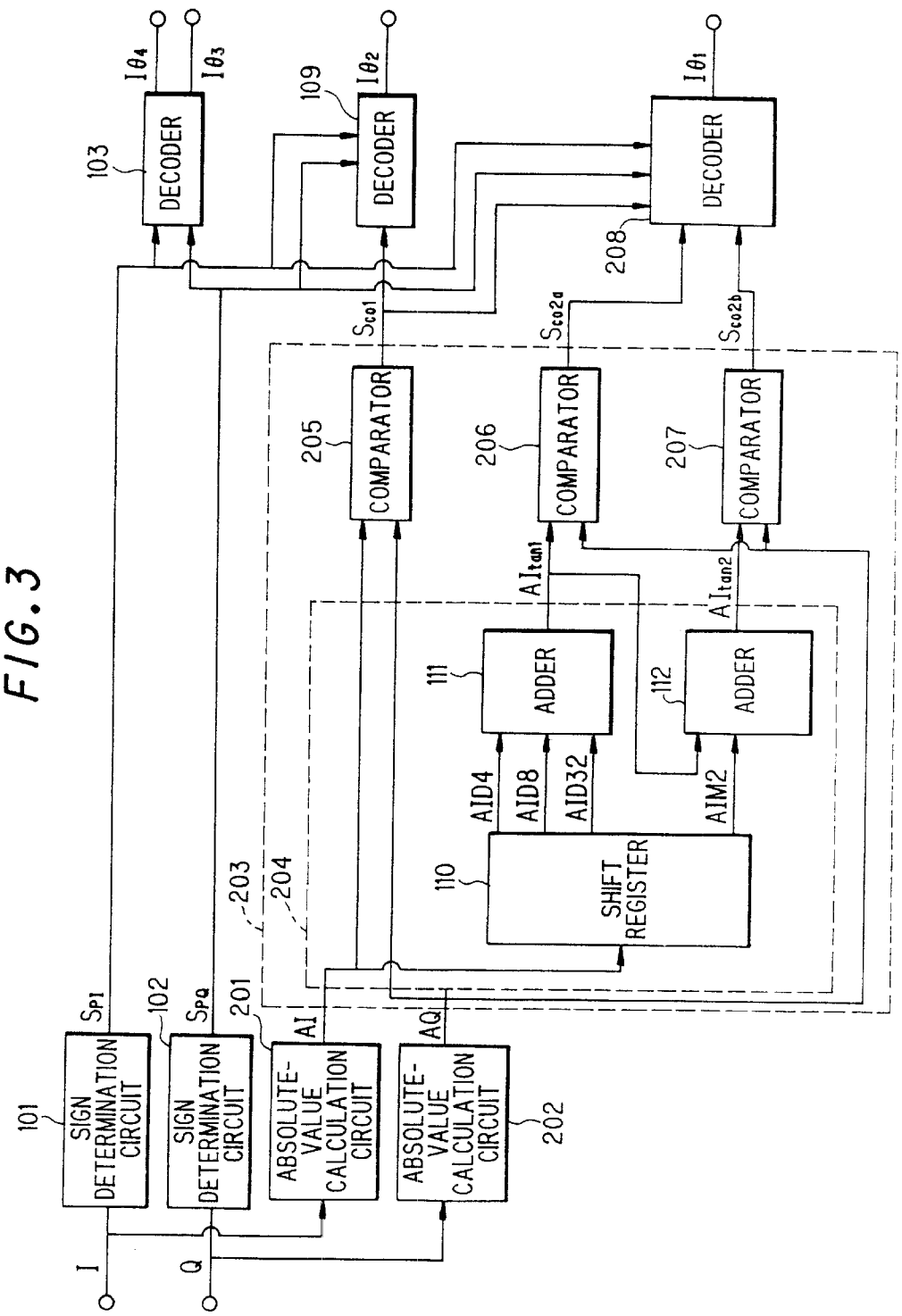
FIG. 3 is a block diagram showing an angle calculation circuit in a second preferred embodiment according to the invention.

FIG. 3 is a block diagram showing the second preferred embodiment according to the invention. In FIG.3, like parts are indicated by like numerals used in FIG. 2.

The sign determination circuit 101 is input with in-phase signal I, and outputs in-phase sign determination signal $S_{PI}$ to indicate the sign, positive or negative, of in-phase signal I. The sign determination circuit 102 is input with orthogonal signal Q, and outputs orthogonal sign determination signal $S_{PQ}$ to indicate the sign, positive or negative, of orthogonal signal Q. The decoder 103 is input with in-phase sign determination signal $S_{PI}$ and orthogonal sign determination signal $S_{PQ}$, judging which quadrant the vector represented by in-phase signal I and orthogonal signal Q belongs to, thereby determining $I\theta_4$, $I\theta_3$ to indicate the 180°-bit and 90°-bit, respectively, of angle information $I\theta$.

An absolute-value calculation circuit 201 is input with in-phase signal I, and outputs in-phase absolute-value signal AI corresponding to in-phase signal I. An absolute-value calculation circuit 202 is input with orthogonal signal Q, and outputs orthogonal absolute-value signal AQ corresponding to orthogonal signal Q. A comparator 205 is input with in-phase absolute-value signal AI and orthogonal absolute-value signal AQ, comparing the largeness between them, outputting angle-narrowing condition signal $S_{co1}$ to indicate the comparison result.

The decoder 109 is input with in-phase sign determination signal $S_{PI}$, orthogonal sign determination signal $S_{PQ}$ and angle-narrowing condition signal $S_{co1}$. Then it outputs, $I\theta_2=1$, where $I\theta_2$ is 45°-bit of angle information $I\theta$, based on the conditions that orthogonal absolute-value signal AQ is equal to or more than in-phase absolute-value signal AI when angle $\theta$ is larger than 0° and smaller than 90° or when angle $\theta$ is larger than 180° and smaller than 270°, that orthogonal absolute-value signal AQ is equal to or less than in-phase absolute-value signal AI when angle $\theta$ is larger than 90° and smaller than 180° or when angle $\theta$ is larger than 270° and smaller than 360°.

The shift register 110 is input with in-phase absolute-value signal AI, then outputting ¼-time in-phase absolute-value signal AID4 to ¼ times it by 2-bit shifting, ⅛-time in-phase absolute-value signal AID8 to ⅛ times it by 3-bit shifting, 1/32 time in-phase absolute-value signal AID32 to 1/32 times it by 5-bit shifting, and 2-time in-phase absolute-value signal AIM2 to 2 times it by 1-bit shifting. The adder 111 is input with ¼-time in-phase absolute-value signal AID4, ⅛-time in-phase absolute-value signal AID8 and 1/32-time in-phase absolute-value signal AID32, adding them, then outputting tangent signal $AI_{tan1}$ corresponding to a value obtained multiplying in-phase absolute-value signal AI by tan 22.5°. The adder 112 is input with tangent signal $AI_{tan}$ and 2-time in-phase absolute-value signal AIM2, adding them, then outputting tangent signal $AI_{tan2}$ corresponding to a value obtained multiplying in-phase absolute-value signal AI by tan 67.5°.

A comparator 206 is input with tangent signal $AI_{tan1}$ and orthogonal absolute-value signal AQ, comparing the largeness between them, outputting angle-narrowing condition signal $S_{co2a}$ to indicate the comparison result. A comparator 207 is input with tangent signal $AI_{tan2}$ and orthogonal absolute-value signal AQ, comparing the largeness between them, outputting angle-narrowing condition signal $S_{co2b}$ to indicate the comparison result.

A decoder 208 is input with in-phase sign determination signal $S_{PI}$, orthogonal sign determination signal $S_{PQ}$, angle-narrowing condition signal $S_{co1}$, angle-narrowing condition signal $S_{co2a}$ and angle-narrowing condition signal $S_{co2b}$. Then, it outputs $I\theta_1=1$, where $I\theta_1$ is 22.5°-bit of angle information $I\theta$, based on the conditions that orthogonal absolute-value signal AQ is equal to or more than tangent signal $AI_{tan1}$ when angle $\theta$ is larger than 0° and smaller than 45° or when angle $\theta$ is larger than 180° and smaller than 225°, that orthogonal absolute-value signal AQ is equal to or more than tangent signal $AI_{tan2}$ when angle 6 is larger than 45° and smaller than 90° or when angle $\theta$ is larger than 225° and smaller than 270°, that orthogonal absolute-value signal AQ is equal to or less than tangent signal $AI_{tan2}$ when angle $\theta$ is larger than 90° and smaller than 135° or when angle $\theta$ is larger than 270° and smaller than 315°, that orthogonal absolute-value signal AQ is equal to or less than tangent signal $AI_{tan1}$ when angle $\theta$ is larger than 135° and smaller than 180° or when angle $\theta$ is larger than 315° and smaller than 360°.

In FIG.3, an angle-narrowing condition generating circuit 203 and a tangent calculation circuit 204 are indicated by dotted lines. The angle calculation can be conducted by the simple circuit composition thus formed.

Meanwhile, the tangent calculation circuit 204 can be generalized as below. The tangent calculation circuit 204 can be defined as such a circuit that is input with in-phase absolute-value signal and then outputs a group of tangent signals obtained multiplying the in-phase absolute-value signal by tan $\phi_{n,i}$ ($\phi_{n,i}=\{½^n+i/2^{n-1}\}\times 360°$, n=4,5, ..., L, i=0,1, ..., $2^{n-3}-1$) when $\theta_{n,i}$ is smaller than 45°, or by tan $(90°-_{n,i})$ when $\theta_{n,i}$ is larger than 45°.

In the embodiment in FIG. 3, for example, taken is a case that in-phase signal I and orthogonal signal Q are 8-bit quantized as $I=(I_8I_7I_6I_5I_4I_3I_2I_1)=(10011011)$ and $Q=(Q_8Q_7Q_6Q_5Q_4Q_3Q_2Q_1)=(10110101)$. Here, in-phase signal I and orthogonal signal Q are represented by complement of two, and $I_8$ and $Q_8$ are most significant bits to indicate the sign. Hereupon, in-phase signal I and orthogonal signal Q are −100 and −75, respectively, in decimal system. Since in-phase signal I is negative and orthogonal signal Q is negative, in-phase sign determination signal $S_{PI}$ is true on the condition of I<0 and orthogonal sign determination signal $S_{PQ}$ is true on the condition of Q<0. Therefore, angle $\theta$ is 180°<$\theta$<270°, and $I\theta_4=1$, $I\theta_3=0$ are obtained.

Since angle $\theta$ is 180°<$\theta$<270°, the condition to give $I\theta_2=1$ is that orthogonal absolute-value signal AQ is equal to or more than in-phase absolute-value signal AI. Orthogonal absolute-value signal AQ=(01001011) and in-phase absolute-value signal AI=(01100100) are obtained, and angle-narrowing condition signal $S_{co1}$ is true on the condition that orthogonal absolute-value signal AQ is smaller than in-phase absolute-value signal AI. Since this does not satisfy the condition to give $I\theta_2=1$, $I\theta_2=0$ is obtained.

Since 180°<$\theta$<225° is thus obtained, the condition to give $I\theta_1=1$ is that orthogonal absolute-value signal AQ is equal to or more than tangent signal $AI_{tan1}$.

Tangent signal $AI_{tan1}$ is (¼+⅛+1/32)≈0.408 times in-phase absolute-value signal AI, 0.408 approximates to tan 22.5°≈0.414. Here, tangent signal $AI_{tan1}$=(00101000) is obtained. Angle-narrowing condition signal $S_{co2a}$ is true on the condition that orthogonal absolute-value signal AQ is larger than tangent signal $AI_{tan}$. Since this satisfies the condition to give $I\theta_1=1$, $I\theta_1=1$ is obtained.

Figure 6:
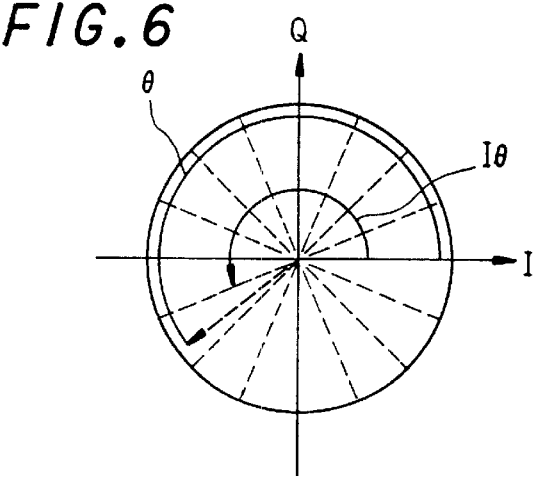
FIG. 6 is an illustration showing an example of angle calculation in the second embodiment.

Accordingly, angle information $I\theta=(I\theta_4 I\theta_3 I\theta_2 I\theta_1)$=(1001) is obtained, and this corresponds to 202.5°. The accurate angle $\theta$ is $\tan^{-1}$ (Q/I)≈217°. These are shown on the coordinate axes in FIG.6, which proves that the angle calculation is conducted by unit of 22.5°.

Figure 4:
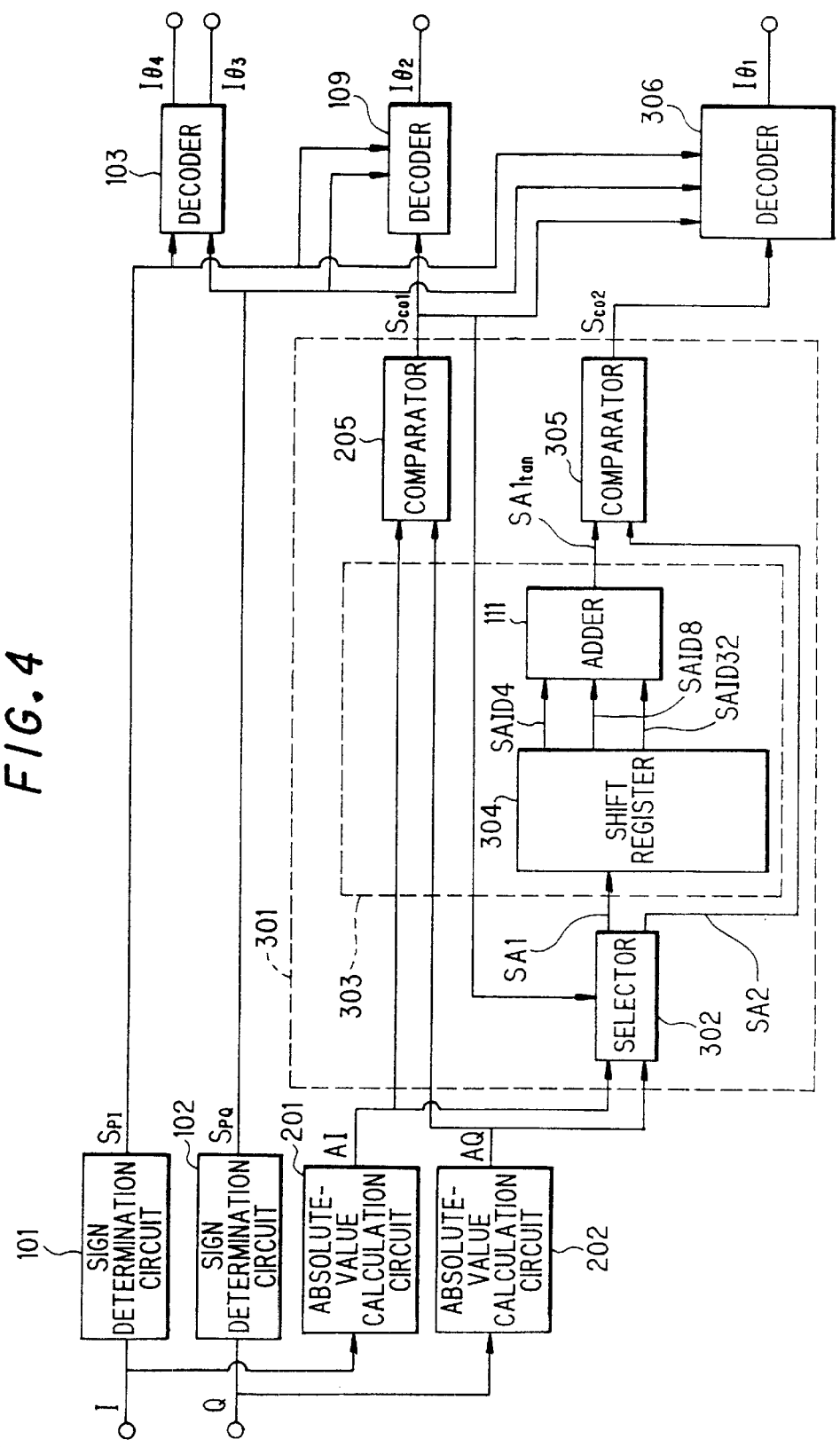
FIG. 4 is a block diagram showing an angle calculation circuit in a third preferred embodiment according to the invention.

FIG. 4 is a block diagram showing the third preferred embodiment according to the invention. In FIG.4, like parts are indicated by like numerals used in FIGS. 2 and 3.

The sign determination circuit 101 is input with in-phase signal I, and outputs in-phase sign determination signal $S_{PI}$ to indicate the sign, positive or negative, of in-phase signal I. The sign determination circuit 102 is input with orthogonal signal Q, and outputs orthogonal sign determination signal $S_{PQ}$ to indicate the sign, positive or negative, of orthogonal signal Q. The decoder 103 is input with in-phase sign determination signal $S_{PI}$ and orthogonal sign determination signal $S_{PQ}$, judging which quadrant the vector represented by in-phase signal I and orthogonal signal Q belongs to, thereby determining $I\theta_4$, $I\theta_3$ to indicate the 180°-bit and 90°-bit, respectively, of angle information $I\theta$.

The absolute-value calculation circuit 201 is input with in-phase signal I, and outputs in-phase absolute-value signal AI corresponding to in-phase signal I. The absolute-value calculation circuit 202 is input with orthogonal signal Q, and outputs orthogonal absolute-value signal AQ corresponding to orthogonal signal Q. The comparator 205 is input with in-phase absolute-value signal AI and orthogonal absolute-value signal AQ, comparing the largeness between them, outputting angle-narrowing condition signal $S_{co1}$ to indicate the comparison result.

The decoder 109 is input with in-phase sign determination signal $S_{PI}$, orthogonal sign determination signal $S_{PQ}$ and angle-narrowing condition signal $S_{co1}$. Then it outputs, $I\theta_2=1$, where $I\theta_2$ is 45°-bit of angle information $I\theta$, based on the conditions that orthogonal absolute-value signal AQ is equal to or more than in-phase absolute-value signal AI when angle $\theta$ is larger than 0° and smaller than 90° or when angle $\theta$ is larger than 180° and smaller than 270°, that orthogonal absolute-value signal AQ is equal to or less than in-phase absolute-value signal AI when angle $\theta$ is larger than 90° and smaller than 180° or when angle $\theta$ is larger than 270° and smaller than 360°.

A selector 302 is input with in-phase absolute-value signal AI, orthogonal absolute-value signal AQ and angle-narrowing condition signal $S_{co1}$, then outputting larger one of in-phase absolute-value signal AI and orthogonal absolute-value signal AQ as selection absolute-value signal SA1, and smaller one as selection absolute-value signal SA2.

The shift register 110 is input with selection absolute-value signal SA1, then outputting ¼-time selection absolute-value signal SAID4 to ¼ times it by 2-bit shifting, ⅛-time selection absolute-value signal SAID8 to ⅛ times it by 3-bit shifting, and 1/32 time selection absolute-value signal SAID32 to 1/32 times it by 5-bit shifting. The adder 111 is input with ¼-time selection absolute-value signal SAID4, ⅛-time selection absolute-value signal SAID8 and ½2-time selection absolute-value signal SAID32, adding them, then outputting tangent signal $SA1_{tan}$ corresponding to a value obtained multiplying selection absolute-value signal SA1 by tan 22.5°.

A comparator 305 is input with tangent signal $SA1_{tan}$ and selection absolute-value signal SA2, comparing the largeness between them, outputting angle-narrowing condition signal $S_{co2}$ to indicate the comparison result.

A decoder 306 is input with in-phase sign determination signal $S_{PI}$, orthogonal sign determination signal $S_{PQ}$, angle-narrowing condition signal s and angle-narrowing condition signal $S_{co2}$. Then, it outputs $I\theta_1=1$, where $I\theta_1$ is 22.5°-bit of angle information I θ, based on the conditions that selection absolute-value signal SA2 is equal to or more than tangent signal $SA1_{tan}$ when angle θ is larger than 0° and smaller than 45°, when angle θ is larger than 90° and smaller than 135°, when angle θ is larger than 180° and smaller than 225°, or when angle θ is larger than 270° and smaller than 315°, and that selection absolute-value signal SA2 is equal to or less than tangent signal $SA1_{tan}$ when angle θ is larger than 45° and smaller than 90°, when angle θ is larger than 135° and smaller than 180°, when angle θ is larger than 225° and smaller than 270°, or when angle θ is larger than 315° and smaller than 360°.

In FIG.4, an angle-narrowing condition generating circuit 301 and a tangent calculation circuit 303 are indicated by dotted lines. The angle calculation can be conducted by the simple circuit composition thus formed.

Meanwhile, the tangent calculation circuit 303 can be generalized as below. The tangent calculation circuit 303 can be defined as such a circuit that is input with in-phase absolute-value signal, orthogonal absolute-value signal and absolute-value comparison signal, and includes the selector to output larger one of in-phase absolute-value signal and orthogonal absolute-value signal as first selection absolute-value signal and smaller one as second selection absolute-value signal, and outputs a group of tangent signals obtained multiplying the input first selection absolute-value signal by tan $\phi_{n,i}$ ($\phi_{n,i}=\{½^n=i/2^{n-1}\}\times360°$, n=4,5, ..., L, i=0,1 ..., $2^{n-3}-1$) when angle θ is larger than 0° and smaller than 90° or when angle θ is larger than 180° and smaller than 270°, or by tan $(90°-\phi_{n,i})$ when angle θ is larger than 90° and smaller than 180° or when angle θ is larger than 270° and smaller than 360°.

In the embodiment in FIG.4, for example, taken is a case that in-phase signal I and orthogonal signal Q are 8-bit quantized as $I=(I_8I_7I_6I_5I_4I_3I_2I_1)=(01011010)$ and $Q=(Q_8Q_7Q_6Q_5Q_4Q_3Q_2Q_1)=(11101100)$. Here, in-phase signal I and orthogonal signal Q are represented by complement of two, and $I_8$ and $Q_8$ are most significant bits to indicate the sign. Hereupon, in-phase signal I and orthogonal signal Q are 90 and −20, respectively, in decimal system. Since in-phase signal I is positive and orthogonal signal Q is negative, in-phase sign determination signal $S_{PI}$ is true on the condition of I>0 and orthogonal sign determination signal $S_{PQ}$ is true on the condition of Q<0. Therefore, angle θ is 270°<θ<360°, and $I\theta_4=1$, $I\theta_3=1$ are obtained.

Since angle θ is 270°<θ<360°, the condition to give $I\theta_2=1$ is that orthogonal absolute-value signal AQ is equal to or less than in-phase absolute-value signal AI. orthogonal absolute-value signal AQ=(00010100) and in-phase absolute-value signal AI=(01011010) are obtained, and angle-narrowing condition signal $S_{co1}$ is true on the condition that orthogonal absolute-value signal AQ is smaller than in-phase absolute-value signal AI. Since this satisfies the condition to give $I\theta_2=1$, $I\theta_2=1$ is obtained.

Since 315°<θ<360° is thus obtained, the condition to give $I\theta_1=1$ is that selection absolute-value signal SA2 is equal to or less than tangent signal $SA1_{tan}$.

Selection absolute-value signal SA1=(01011010), selection absolute-value signal SA2=(00010100) are obtained, tangent signal $SAI_{tan}$ is (¼+⅛+½2)≈0.408 times selection absolute-value signal SA1, 0.408 approximates to tan 22.5≈0.414. Here, tangent signal $SA1_{tan}$=(00100011) is obtained. Angle-narrowing condition signal $S_{co2}$ is true on the condition that selection absolute-value signal SA2 is smaller than tangent signal $SA1_{tan}$. Since this satisfies the condition to give $I\theta_1=1$, $I\theta_1=1$ is obtained.

Figure 7:
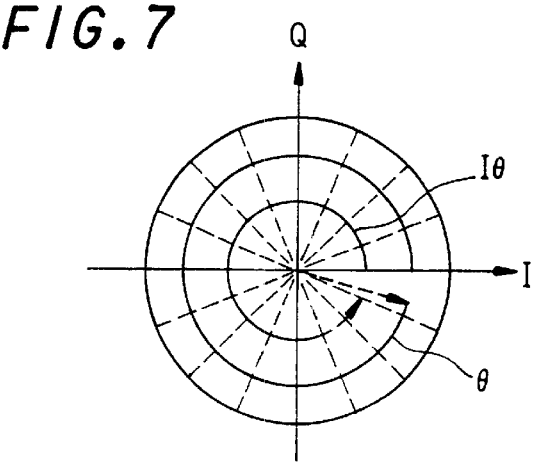
FIG. 7 is an illustration showing an example of angle calculation in the third embodiment.

Accordingly, angle information $I\theta=(I\theta_4I\theta_3I\theta_2I\theta_1)=(1111)$ is obtained, and this corresponds to 337.5°. The accurate angle θ is $\tan^{-1}$ (Q/I)≈347°. These are shown on the coordinate axes in FIG.7, which proves that the angle calculation is conducted by unit of 22.5°.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An angle calculation circuit, comprising:

a sign determination circuit to which two-dimensional vector composed of in-phase signal and orthogonal signal is input and which determines the sign of said in-phase signal and said orthogonal signal and outputs a group of in-phase sign determination signals and a group of orthogonal sign determination signals;

a first decoder to which said group of in-phase sign determination signals and said group of orthogonal sign determination signals are input and which outputs calculating angle information by unit of more than 90° as first angle information signal;

an angle-narrowing condition generating circuit to which said in-phase signal and said orthogonal signal are input and which outputs a group of angle-narrowing condition signals to indicate the conditions for calculating angle information by unit of less than 90°; and a second decoder to which said group of angle-narrowing condition signals, said group of in-phase sign determination signals and said group of orthogonal sign determination signals are input and which outputs calculating angle information by unit of less than 90° as second angle information signal;

wherein said angle-narrowing condition generating circuit comprises a tangent calculation circuit to which said in-phase signal is input and which outputs a group of tangent signals given by multiplying said in-phase signal by tan φ (φ is a predetermined constant to satisfy 0°<φ<90°), and a comparator to which said group of tangent signals and said orthogonal signal are input and which compares said group of tangent signals and said orthogonal signal and outputs said angle-narrowing condition signal.

2. An angle calculation circuit, according to claim 1, wherein:

said unit angle is a value given dividing 360° by $2^L$, where L is a bit number to indicate angle information, and said angle φ is given by $\phi_{n,k,i}=\{½^n+k/4+i/2^{n-1}\}\times360°$, where n is an integer of 3 to L, k is an integer and i is an integer of 0 to $2^{n-3}-1$.

3. An angle calculation circuit, according to claim 2, wherein:

said first decoder is input with said group of in-phase sign determination signals and said group of orthogonal sign determination signals, and outputs first angle information signal to indicate the high-order two bits, which correspond to a quadrant where the input two-dimensional vector exists, of angle information represented L bits by quadrant information;

said second decoder is input with said group of angle-narrowing condition signals, said group of in-phase sign determination signals and said group of orthogonal sign determination signals, and outputs second angle information signal to indicate the low-order (L−2) bits of angle information, as the conditions that the high-order n-th bit of angle information is 1 when angle θ is larger than $(k/4+i/2^{n-1})\times360°$ and smaller than $\{k/4+(I+1)/2^{n-1}\}\times360°$, using that said orthogonal signal is equal to or more than said tangent signal when the angle θ of said two-dimensional vector is larger than 0° and smaller than 90° or is larger than 270° and smaller than 360°, and that said orthogonal signal is equal to or less than said tangent signal when the angle θ of said two-dimensional vector is larger than 90° and smaller than 180° or is larger than 180° and smaller than 270°.

4. An angle calculation circuit, according to claim 2, wherein:

said tangent calculation circuit is input with said in-phase signal, and outputs calculating approximately said group of tangent signals using the composition of a shifter to output a group of in-phase shift signals corresponding to $2^j$ times, where j is an integer, said in-phase signal and addition or subtraction of said group of in-phase shift signals.

5. An angle calculation circuit, comprising:

a sign determination circuit to which two-dimensional vector composed of in-phase signal and orthogonal signal is input and which determines the sign of said in-phase signal and said orthogonal signal and outputs a group of in-phase sign determination signals and a group of orthogonal sign determination signals;

a first decoder to which said group of in-phase sign determination signals and said group of orthogonal sign determination signals are input and which outputs calculating angle information by unit of more than 90° as first angle information signal;

an absolute-value calculation circuit to which said in-phase signal and said orthogonal signal are input and which calculates the absolute values of said in-phase signal and said orthogonal signal and outputs said absolute values said in-phase signal and said orthogonal signal as in-phase absolute-value signal and orthogonal absolute-value signal, respectively;

an angle-narrowing condition generating circuit to which said in-phase absolute-value signal and said orthogonal absolute-value signal are input and which outputs a group of angle-narrowing condition signals to indicate the conditions for calculating angle information by unit of less than 90°; and a second decoder to which said group of angle-narrowing condition signals, said group of in-phase sign determination signals and said group of orthogonal sign determination signals are input and which outputs calculating angle information by unit of less than 90° as second angle information signal;

wherein said angle-narrowing condition generating circuit comprises a tangent calculation circuit to which said in-phase absolute-value signal is input and which outputs a group of tangent signals given by multiplying said in-phase absolute-value signal by either tan φ or tan (90°−φ) (φ is a predetermined constant to satisfy 0°<φ<90°), and a comparator to which said group of tangent signals and said orthogonal absolute-value signal are input and which compares said group of tangent signals and said orthogonal absolute-value signal and outputs said angle-narrowing condition signal.

6. An angle calculation circuit, according to claim 5, wherein:

said unit angle is a value given dividing 360° by $2^L$, where L is a bit number to indicate angle information, and said angle φ is given by $\phi_{n,i}=\{½^n+i/2^{n-1}\}\times360°$, where n is an integer of 4 to L and i is an integer of 0 to $2^{n-3}-1$.

7. An angle calculation circuit, according to claim 6, wherein:

said tangent signal is given by multiplying said in-phase absolute-value signal by tan $(90°-\phi_{n,i})$ when said On i is smaller than 45°, and by tan $(90°-\phi_{n,i})$ when said $\phi_{n,i}$ is larger than 45°.

8. An angle calculation circuit, according to claim 6, wherein:

said first decoder is input with said group of in-phase sign determination signals and said group of orthogonal sign determination signals, and outputs first angle information signal to indicate the high-order two bits, which correspond to a quadrant where the input two-dimensional vector exists, of angle information represented L bits by quadrant information;

said second decoder is input with said group of angle-narrowing condition signals, said group of in-phase sign determination signals and said group of orthogonal sign determination signals, and outputs second angle information signal to indicate the low-order (L−2) bits of angle information, as the conditions that the high-order n-th bit of angle information is 1 when angle θ is larger than $(k/4+i/2^{n-1})\times360°$ and smaller than $\{k/4+(I+1)/2^{n-1}\}\times360°$, using that said orthogonal absolute-value signal is equal to or more than said tangent signal when the angle θ of said two-dimensional vector is larger than 0° and smaller than 90° or is larger than 180° and smaller than 270°, and that said orthogonal signal is equal to or less than said tangent signal when the angle θ of said two-dimensional vector is larger than 90° and smaller than 180° or is larger than 270° and smaller than 360°.

9. An angle calculation circuit, according to claim 6, wherein:

said tangent calculation circuit is input with said selection absolute-value signal, and outputs calculating approximately said group of tangent signals using the composition of a shifter to output a group of in-phase absolute-value shift signals corresponding to $2^j$ times, where j is an integer, said in-phase absolute-value signal and addition or subtraction of said group of in-phase absolute value shift signals.

10. An angle calculation circuit, comprising:

a sign determination circuit to which two-dimensional vector composed of in-phase signal and orthogonal signal is input and which determines the sign of said in-phase signal and said orthogonal signal and outputs a group of in-phase sign determination signals and a group of orthogonal sign determination signals;

a first decoder to which said group of in-phase sign determination signals and said group of orthogonal sign determination signals are input and which outputs calculating angle information by unit of more than 90° as first angle information signal;

an absolute-value calculation circuit to which said in-phase signal and said orthogonal signal are input and which calculates the absolute values of said in-phase signal and said orthogonal signal and outputs said absolute values said in-phase signal and said orthogonal signal as in-phase absolute-value signal and orthogonal absolute-value signal, respectively;

an angle-narrowing condition generating circuit to which said in-phase absolute-value signal and said orthogonal absolute-value signal are input and which outputs absolute-value comparison signal to indicate the comparison result of said in-phase absolute-value signal and said orthogonal absolute-value signal, and outputs a group of angle-narrowing condition signals to indicate the conditions for calculating angle information by unit of less than 90°; and a second decoder to which said absolute-value comparison signal, said group of angle-narrowing condition signals, said group of in-phase sign determination signals and said group of orthogonal sign determination signals are input and which outputs calculating angle information by unit of less than 90° as second angle information signal;

wherein said angle-narrowing condition generating circuit comprises a first comparator to which said in-phase absolute-value signal and said orthogonal absolute-value signal are input and which compares said in-phase absolute-value signal and said orthogonal absolute-value signal and outputs said absolute-value comparison signal, a selector to which said in-phase absolute-value signal, said orthogonal absolute-value signal and said absolute-value comparison signal are input and which outputs larger one of said in-phase absolute-value signal and said orthogonal absolute-value signal as first selection absolute-value signal and smaller one of said in-phase absolute-value signal and said orthogonal absolute-value signal as second selection absolute-value signal, a tangent calculation circuit to which said first selection absolute-value signal is input and which outputs a group of tangent signals given by multiplying said first selection absolute-value signal by either $\tan \phi$ or $\tan(90°-\phi)$ ($\phi$ is a predetermined constant to satisfy $0°<\phi<90°$), and a second comparator to which said group of tangent signals and said second selection absolute-value signal are input and which compares said group of tangent signals and said second selection absolute-value signal and outputs said angle-narrowing condition signal.

11. An angle calculation circuit, according to claim 10, wherein:

said unit angle is a value given dividing 360° by $2^L$, where L is a bit number to indicate angle information, and said angle $\phi$ is given by $\phi_{n,i}=\{\frac{1}{2}^n+i/2^{n-1}\}\times 360°$, where n is an integer of 4 to L and i is an integer of 0 to $2^{n-3}-1$.

12. An angle calculation circuit, according to claim 11, wherein:

said tangent signal is given by multiplying said first selection absolute-value signal by $\tan \phi_{n,i}$ when angle $\theta$ is larger than 0° and smaller than 90° or when angle $\theta$ is larger than 180° and smaller than 270°, and by $\tan(90°-\phi_{n,i})$ when angle $\theta$ is larger than 90° and smaller than 180° or when angle $\theta$ is larger than 270° and smaller than 360°.

13. An angle calculation circuit, according to claim 11, wherein:

said first decoder is input with said group of in-phase sign determination signals and said group of orthogonal sign determination signals, and outputs first angle information signal to indicate the high-order two bits, which correspond to a quadrant where the input two-dimensional vector exists, of angle information represented L bits by quadrant information;

said second decoder is input with said group of angle-narrowing condition signals, said group of in-phase sign determination signals and said group of orthogonal sign determination signals, and outputs second angle information signal to indicate the low-order (L−2) bits of angle information, as the conditions that the high-order n-th bit of angle information is 1 when angle $\theta$ is larger than $(k/4+i/2^{n-1})\times 360°$ and smaller than $\{k/4+(I+1)/2^{n-1}\}\times 360°$, using that said orthogonal absolute-value signal is equal to or more than said tangent signal when the angle $\theta$ of said two-dimensional vector is larger than 0° and smaller than 90° or is larger than 180° and smaller than 270°, and that said orthogonal signal is equal to or less than the sign-inverted value of said tangent signal when the angle $\theta$ of said two-dimensional vector is larger than 90° and smaller than 180° or is larger than 270° and smaller than 360°.

14. An angle calculation circuit, according to claim 11, wherein:

said tangent calculation circuit is input with said selection absolute-value signal, and outputs calculating approximately said group of tangent signals using the composition of a shifter to out put a group of selection absolute-value shift signals corresponding to $2^j$ times, where j is an integer, said selection absolute-value signal and addition or subtraction of said group of selection absolute-value shift signals.

* * * * *